United States Patent Office 3,552,981
Patented Jan. 5, 1971

3,552,981
FERMENTING WHEY AND PRODUCING SOY SAUCE FROM FERMENTED WHEY
Anthony J. Luksas, Chicago, Ill., assignor to Beatrice Foods Co., Chicago, Ill., a corporation of Delaware
No Drawing. Continuation-in-part of application Ser. No. 743,014, July 8, 1968. This application May 29, 1969, Ser. No. 829,126
Int. Cl. H23c 21/00; A23l 1/22
U.S. Cl. 99—145
10 Claims

ABSTRACT OF THE DISCLOSURE

Whey is fermented with a lactase enzyme under aerobic conditions with agitation to obtain a ferment. To the ferment is added a hydrolyzed vegetable protein and salt and the mixture is heated to at least 150° F. After heating a fermented type soy sauce is obtained. This can be mixed with non-fermented soy sauce or additional hydrolyzed vegetable protein to give a fermented oriental type soy sauce flavor.

---

This is a continuation-in-part of copending application Ser. No. 743,014, filed on July 8, 1968, and entitled Whey Flavoring Agent.

In the aforementioned application, it was disclosed that a fermented type soy sauce could be produced when whey is fermented with a combination of a lactase enzyme or lactase producing organism and *Saccharomyces cerevisiae* under aerobic conditions with agitation. According to that disclosure, it was necessary to use a combination of *Saccharomyces cerevisiae* and a lactase enzyme or lactase producing organism, e.g. *Saccharomyces fragilis*, *Saccharomyces lactis* and *Saccharomyces unisporum*, since the correct characteristic flavor of soy sauce could not be produced without the combination. This limitation of the disclosed process was necessary since when the lactase or lactase producing organism was used alone, without *Saccharomyces cerevisiae*, the resulting fermented composition exhibited a very disagreeable odor, which was not acceptable for commercial utilization of the produced flavor.

However, it was recognized that advantages of simplicity and ease of producing the flavor could be achieved if a lactase producing organism could be used alone to produce the desired soy flavor and without the disagreeable odor.

Accordingly, an object of the present invention is to provide a process whereby a good soy sauce flavor may be developed without the necessity of using *Saccharomyces cerevisiae* with the lactase producing organisms.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects may be obtained without the necessity of using *Saccharomyces cerevisiae* to develop the soy sauce flavor and without the resulting product having an objectionable odor. Broadly speaking, the present improvement comprises inoculating whey with a lactase producing organism such as *Saccharomyces fragilis*, *Saccharomyces lactis* and *Saccharomyces unisporum*, fermenting the inoculated whey with aeration and stirring to produce the soy sauce flavor (a very disagreeable odor also develops), mixing the fermented whey with the soy sauce flavor developed with hydrolyzed vegetable protein and salt and heating to at least 150° F., whereby the disagreeable odor is substantially completely removed, while the soy sauce flavor is retained. The whey may be as desired, e.g. milk whey, soya bean whey.

While any method of heating to at least 150° F. may be used, it is most convenient to simply spray dry the resulting mixture at temperatures above 150° F. Alternately, the mixture may be simply heated, e.g. in an open vessel to 150° F.

After being heated to at least 150° F. and up to the boiling point of the mixture, the disagreeable odor is removed and the resulting product has an intense flavor.

The fluid whey is normally pasteurized before adding the lactase producing organism. Pasteurization can be accomplished under conventional pasteurization conditions, e.g. 145° F. for 30 minutes or 161° F. for 15 seconds or there can be used higher temperatures and shorter time periods, e.g. 300° F. for 30 seconds, 310° F. for 15 seconds or 1 second, 245° F. for 15 minutes, 260° F. for 10 minutes.

Following pasteurization there is added to the fluid whey a lactase producing organism such as noted above. The lactase producing organism is introduced in amounts of at least 10 organisms per cc. of whey, especially 1,000, e.g. 10,000 organisms per cc. of whey. After adding the organism, the system is aerated and agitated throughout the fermentation. Preferably fermentation is carried out at 75° F., but this can be varied, e.g. from 60° F. to 105° F. Stirring and agitation are continued for 12 to 24 hours.

An intense flavor develops as a result of the organism's action on the whey, and the disagreeable odor also develops. After the odor is removed by adding the hydrolyzed vegetable protein and salt followed by heating from 150° F. to the boiling point, e.g. by spray drying; the resulting intense flavored composition can be combined with a non-fermented soy sauce, e.g. imitation soya sauce flavor, and/or additional hydrolyzed vegetable protein with or without flavorings to obtain a fermented oriental type soy sauce flavor.

Thus, there can be employed 2 parts of the fermented whey to 1 part of soy sauce by volume, or 5 parts of fermented whey to 1 part of soy sauce by volume or 5 parts of fermented whey to 1 part of soy sauce by volume. As little as 0.5 part of fermented whey can be used with 1.5 parts by volume of soy sauce. There can be added additional salt as desired, e.g. 5% salt on a dry basis. There can be 18% salt by weight in the final liquid product to act as preservative. The ferment acts as an extender for fermented soy sauce.

The fermented whey must be mixed with the hydrolyzed vegetable protein in a ratio of between 40 to 80 parts of fermented to 60 to 20 parts of hydrolyzed vegetable protein, preferably in ratios of between 50 to 70 parts of ferment to 50 to 30 parts of hydrolyzed protein. Also for each part of ferment from 0.05 to 1.5 parts of salt (NaCl) must be added, e.g. from 0.75 to 1.25 parts of salt. A very excellent combination is 60 parts ferment, 35 parts hydrolyzed vegetable protein and 5 parts of salt. In the above all parts are by weight.

After the mixture of ferment, hydrolyzed vegetable protein and salt is made, it is heated from 150° F. up to the boiling point. While the disagreeable odor will be removed almost immediately after reaching 150° F., in order to insure that the odors are substantially completely removed, the mixture should dwell at that temperature, preferably with aeration and vigorous stirring, for up to 10 minutes, e.g. 5 minutes or 1 minute or less. However, no dwell time at all is necessary when the mixture is spray dried. The spray drying is simply accomplished in a conventional spray drying tower. Of course, when spray drying is used, the dry powder may be reconstituted to the original volume or some other volume, as desired, by mixing with any edible liquid, e.g. water, so that the reconstituted flavor may be mixed in the liquid state with other ingredients, as noted above.

EXAMPLE 1

Whey was pasteurized at 161° F. for 15 seconds. Then there was added 10,000 organisms per cc. of *Sacchromyces fragilis*. The mixture was continuously agitated strongly for 18 hours and at the same time air was passed into the mixture constantly. The mixture had an intense flavor but with a disagreeable odor.

To 60 parts of the mixture was added 35 parts of hydrolyzed soya protein and 5 parts of salt (all parts by weight). The resulting mixture was heated to 160° F. with vigorous stirring while passing air therethrough. After dwelling at 160° F. for 5 minutes the mixture was cooled. An intense flavor remained without the previous disagreeable odors.

EXAMPLE 2

To 2 parts of the fermented whey prepared in Example 1 where was added 1 part of soy sauce by volume to obtain a fermented oriental type soy sauce flavor.

EXAMPLE 3

Example 1 was repeated except that the mixture was spray dried in a conventional spray dryer with an inlet temperature of 160° F. The dried ferment was reconstituted with water to the volume before spray drying. Two parts of the reconstituted flavor was mixed with 1 part of soy sauce and the same fermented oriental type soy sauce as in Example 2 was obtained.

Instead of hydrolyzed soya protein, hydrolyzed corn, maize, wheat, rye, barley, oats, etc. protein may be used and preferably hydrolyzed soybean protein is used.

What is claimed is:

1. A process of preparing fermented whey comprising adding to whey a lactase producing organism, allowing fermentation to proceed with agitation and aeration until an intense flavor develops, adding to the resulting ferment (1) a hydrolyzed vegetable protein, and (2) salt, and heating the mixture to at least 150° F.
2. A process according to claim 1 wherein the fermentation is continued for 12 to 24 hours.
3. A fermented whey product prepared by the process of claim 1.
4. The process according to claim 1 wherein the heated mixture is spray dried.
5. The process according to claim 1 wherein the mixture contains about 60 parts ferment, 35 parts hydrolyzed vegetable protein and 5 parts salt.
6. A soy sauce prepared by admixing non-fermented soy sauce with the fermented whey product prepared according to claim 1.
7. A soy sauce according to claim 6 wherein they are from ⅓ to 5 parts of fermented whey per part of non-fermented soy sauce by volume.
8. A soy sauce according to claim 7 including additional salt.
9. The process according to claim 1 wherein from 60 to 20 parts of hydrolyzed vegetable proteins are mixed with from 40 to 80 parts of the ferment.
10. The process according to claim 9 wherein the mixture is heated to its boiling point.

References Cited

UNITED STATES PATENTS 2,128,845    8/1938    Myers et al. _____ 99—59

A. LOUIS MONACELL, Primary Examiner

W. A. SIMON, Assistant Examiner

U.S. Cl. X.R.

99—57, 59, 98